April 2, 1929.  A. MIDENCE  1,707,868

PORTABLE TALKING MACHINE

Filed Dec. 20, 1924    5 Sheets-Sheet 1

Inventor
A. Midence
By Marks & Clark
Attys.

April 2, 1929.  A. MIDENCE  1,707,868
PORTABLE TALKING MACHINE
Filed Dec. 20, 1924   5 Sheets-Sheet 2

Inventor
A. Midence
By Marks & Clerk

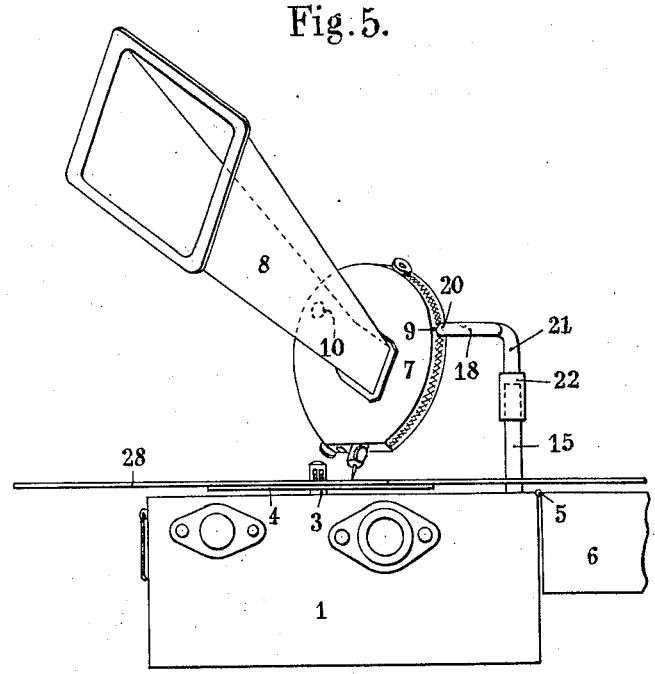
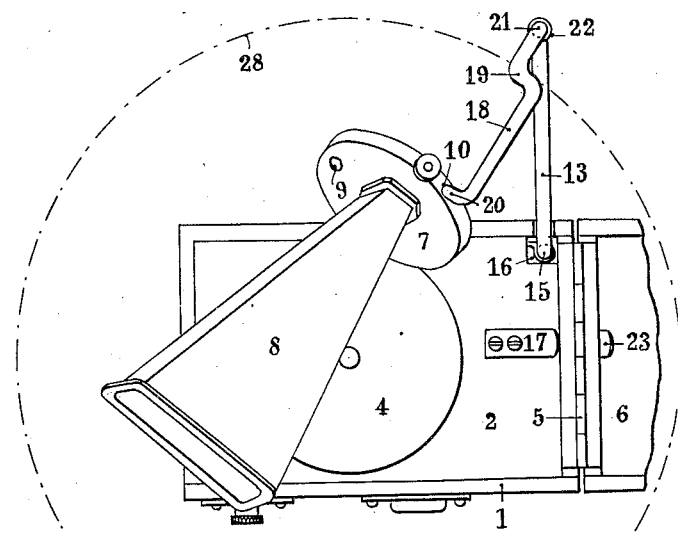

April 2, 1929.     A. MIDENCE     1,707,868
PORTABLE TALKING MACHINE
Filed Dec. 20, 1924     5 Sheets-Sheet 4
Fig.7.
Fig.9.
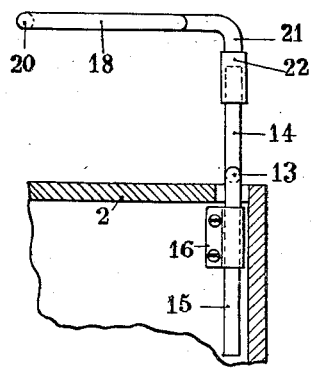
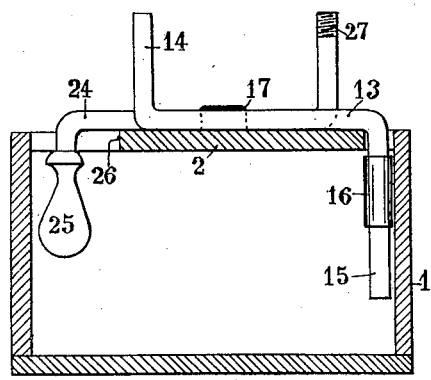
Fig.8.
Fig.10.
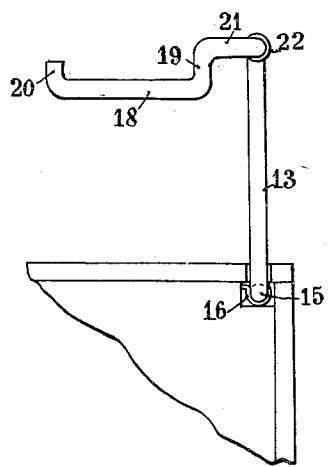
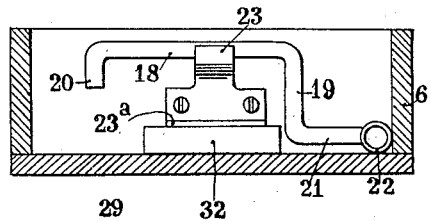
Fig.13.
Fig.14.
Fig.11.
Fig.12.
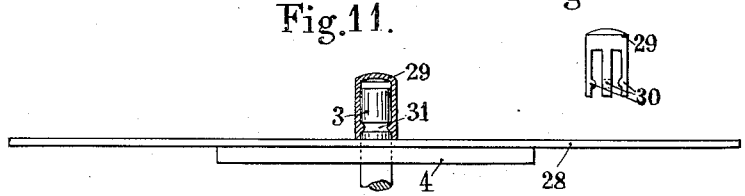
Inventor
A. Midence
By Marks & Clerk
Attys.

April 2, 1929.  A. MIDENCE  1,707,868
PORTABLE TALKING MACHINE
Filed Dec. 20, 1924   5 Sheets-Sheet 5

Inventor
A. Midence
By Marks & Clerk
Attorneys.

Patented Apr. 2, 1929.

1,707,868

UNITED STATES PATENT OFFICE.

ADOLPH MIDENCE, OF PARIS, FRANCE.

PORTABLE TALKING MACHINE.

Application filed December 20, 1924, Serial No. 757,205, and in France July 19, 1924.

The present invention has for its object a talking machine in which the motor, the winding crank, the reproducer and the horn as well as the supporting member for the latter are placed, when the apparatus is not in use, in a box of small size, so as to obtain a portable machine occupying little space and having nevertheless the force and qualities of a large apparatus.

The talking machine in accordance with the present invention is characterized by the following points:

1. The horn support and diaphragm are so combined as to permit its playing with a needle or with a sapphire, and of allowing the horn and diaphragm to pivot into a position of rest, permitting the replacing of the needle and record.

This support is composed:

(a) Of an arm formed of a metal rod having a certain length bent at right angles at its two ends, so as to form two parallel branches of unequal length and in the same direction. The large side of the arm is fitted and slides into a socket vertically secured in the box. When not in its playing position, this arm slides around a half turn and goes under a small spring sleeve. The arm is brought to its position of play by rotating inside of the socket holding it vertically.

(b) Of a second arm or rod of special shape bent into U-shape; one of the branches of the U, of a greater length than the other branch, is extended by a part bent at right angles and terminated by a socket which, for playing, fits on the end of the small branch of the first arm, the small branch of the U-shaped portion fitting in one of the two orifices of the reproducer which can be brought to a resting position by pivoting about its small branch for resting in the U-shaped portion of its second arm, which is in turn placed, when the apparatus is closed, in the cover of the box containing the motor and is held by a hook acting as a spring.

2. The record is supported by a plate of small diameter on which it is firmly secured by the pressure exerted on the record by a sleeve fitting on the end of the vertical shaft carrying the plate and presenting, for instance, one or more spring lugs fitting in a circular groove of the said vertical shaft.

3. The crank for winding up the motor is screwed in a screw threaded sleeve carried by the winding up shaft. When the machine is closed this crank is placed in the box parallel to the first arm of the horn support and is held in the said motor box by the same spring hook.

In order that the invention may be clearly understood, a form of construction of the talking machine forming the subject matter of the said invention will be described hereafter, by way of example only, with reference to the accompanying drawing, in which:

Figs. 5 and 6 are similar views, the reproducer being provided with a sapphire.

Figs. 7 and 8 are an elevation and a plan view of the arm supporting the reproducer and the horn.

Figure 2:
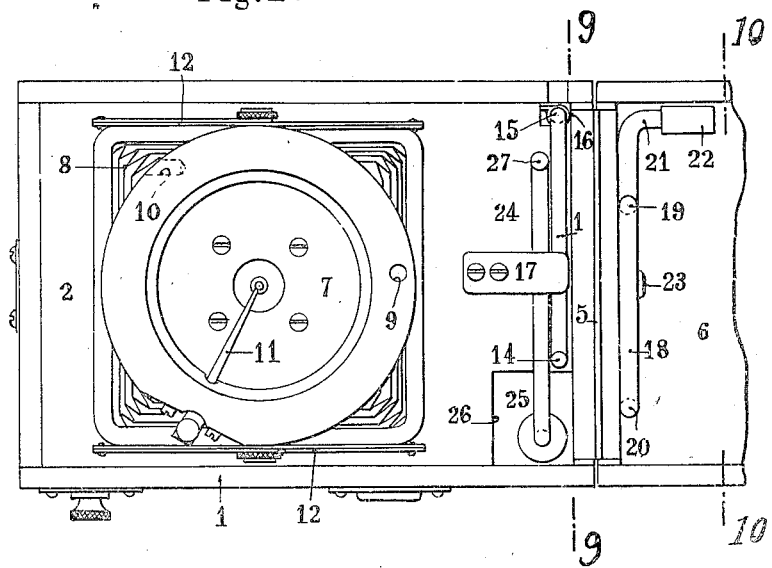
Fig. 2 is a corresponding plan view, the box being open.

Figs. 9 and 10 are two vertical cross sections taken respectively on lines 9—9 and 10—10 of Fig. 2.

Figs. 11 and 12 are detail views showing the sleeve adapted to hold the disc on the plate.

Figs. 13 and 14 show another form of construction of this sleeve.

Figure 15:
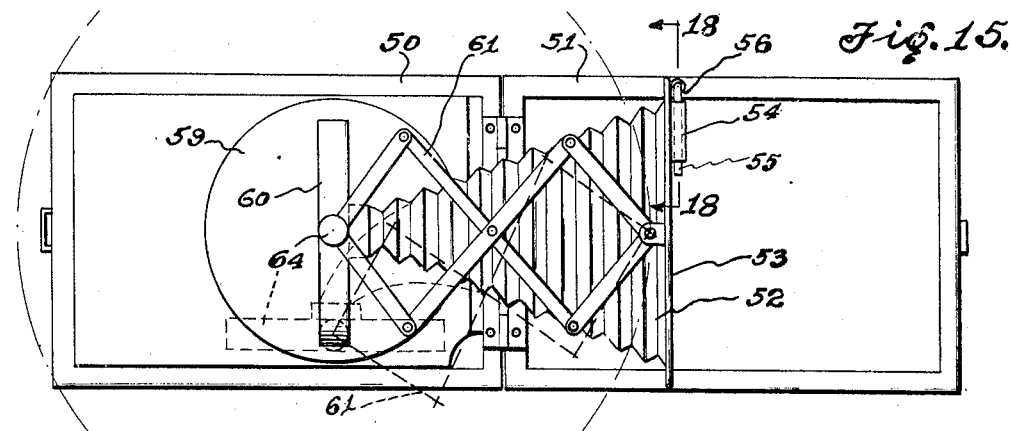

Fig. 15 is a plan view of modified form of apparatus.

Figure 16:
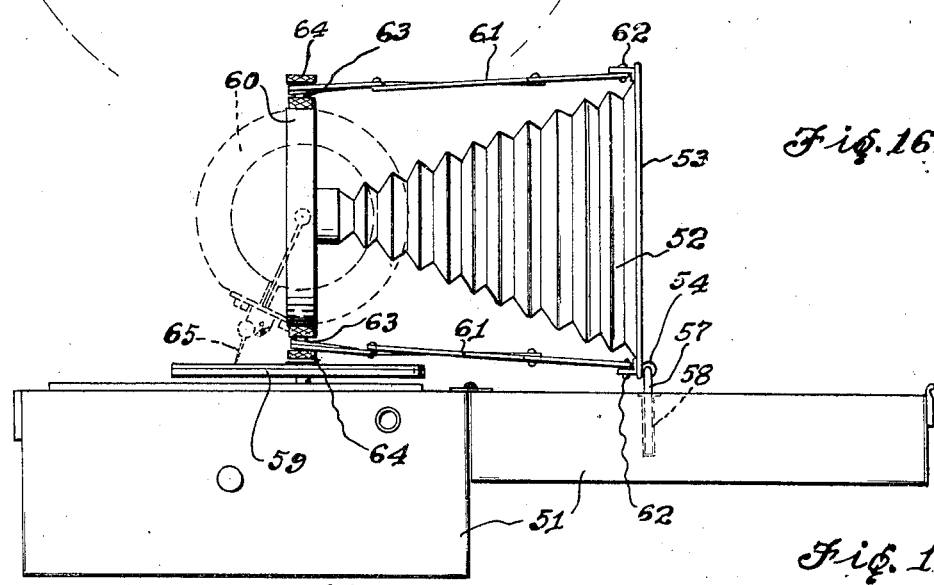

Fig. 16 is a side view of the same.

Figure 17:
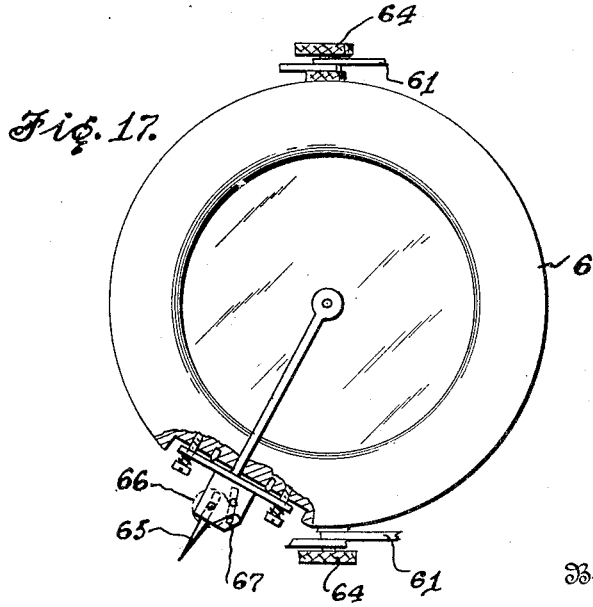

Fig. 17 is an elevation of the sound box forming part of this modification.

Figure 18:
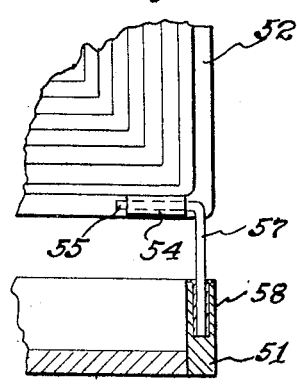

Fig. 18 is a detail sectional view taken on line 18—18 of Fig. 15.

As illustrated in the accompanying drawing, the apparatus in accordance with the invention is so combined that its constituent parts are contained, at rest, in a box of small dimensions in order to obtain a portable apparatus having, the same value in quality and force of sound as large apparatus, but occupying a much reduced space when in its closed position.

The box 1 which is provided with a removable cover 2 contains the motor, the vertical shaft 3 of which passes through the said cover 2, projects outside the latter and carries a circular plate 4 of small diameter, adapted to support and drive a record of ordinary size.

On the upper edge of one of its small sides this box is provided with a cover 6 hinged thereto at 5; this cover, when closed upon the box body, forms a compartment of suitable height to enclose the reproducer 7 and a horn 8 adjustable in length mounted on the reproducer.

In the form of construction illustrated the reproducer, which forms the subject matter of a United States patent application filed on the 15th day of December, 1924, Ser. No. 756,151 in the name of the applicant for "reproducing amplifying diaphragm for talking machines and other sound reproducing instruments," is provided at two suitable points with two circular orifices 9 and 10 arranged at right angles to each other and adapted, as explained in the above mentioned patent application, to permit mounting the reproducer on one and the same supporting arm in two different positions depending upon its being played with a needle or with a sapphire.

Figure 1:
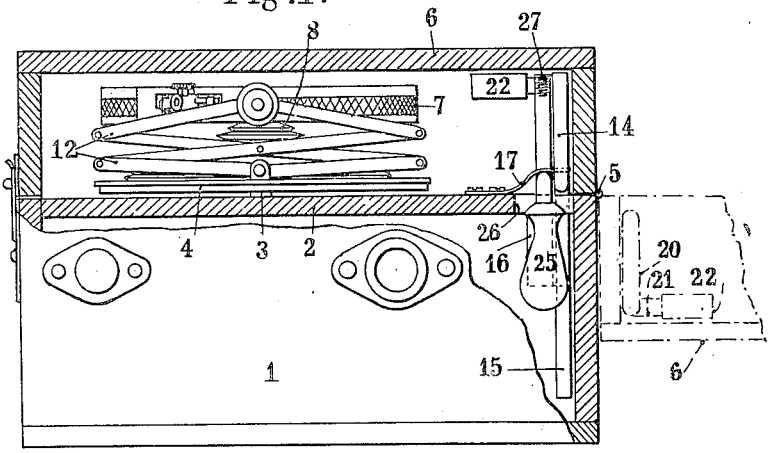
Fig. 1 shows the apparatus at rest, the box enclosing the various parts being closed, and the parts not in view being shown in dotted lines.

On the reproducer is mounted, as described in the United States patent application filed on the 15th day of December, 1924, Ser. No. 756,152 in the name of the applicant, for "amplifying reproducing device for talking machines and other sound reproducing instruments," a horn supported and extended in the modification shown, by bellows 8 provided, at its large base, with a metal frame which is connected to the body of the reproducer 7 by lazy tongs 12, or other jointed cross-bar, permitting the collapsing of the horn 8 in the position of rest or when closed in box 1, as shown in Fig. 1, or the unfolding of this horn to the required length, according to the quality and quantity of sound desired, as shown in Figs. 3 to 6.

In accordance with the present invention, the reproducer 7 with its horn 8 are mounted for playing, on a support of special arrangement constituted by two arms, one of which is formed by a metal rod 13 bent at right angles at both ends in two opposite directions so as to present two branches of unequal length 14 and 15.

In the position of rest or closed position, the longest branch 15 is inserted in a socket 16 secured in one of the corners of the box body 1. The portion 13 rests on the plate 2 closing the motor box and is held in position on the latter by means of a hook 17 serving as a spring and secured on the said plate. The other branch 14 or smaller end, is held vertically above this plate, as shown in Figs. 2 and 9.

When in the playing position, this arm 14 is brought by rotation a half turn sliding inside of the socket 16 as shown in Figures 3 to 8 which brings the arm 13 and its perpendicular branch 14 entirely outside of the box.

The second arm is also constituted by a metal rod 18, bent in U shape; one of the branches 19 of the U being greater than the other branch 20 and having an extension 21 bent at right angles and terminating by a socket 22.

Figure 3:
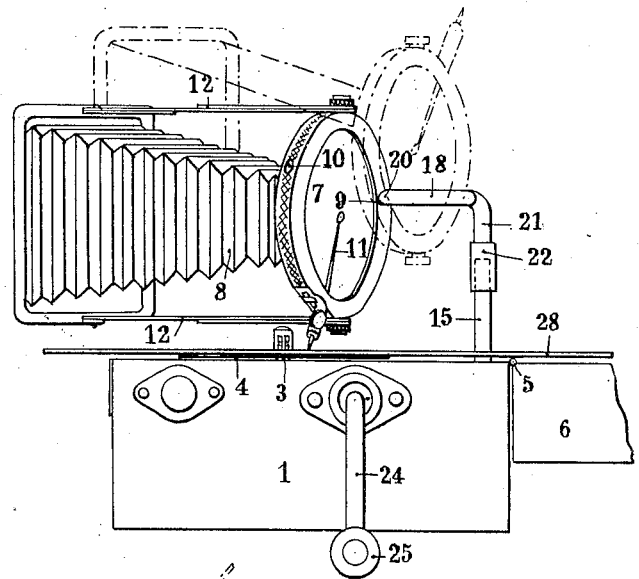
Figs. 3 and 4 are an elevation and a plan view of the apparatus in use, the reproducer being provided with a needle.
Figure 4:
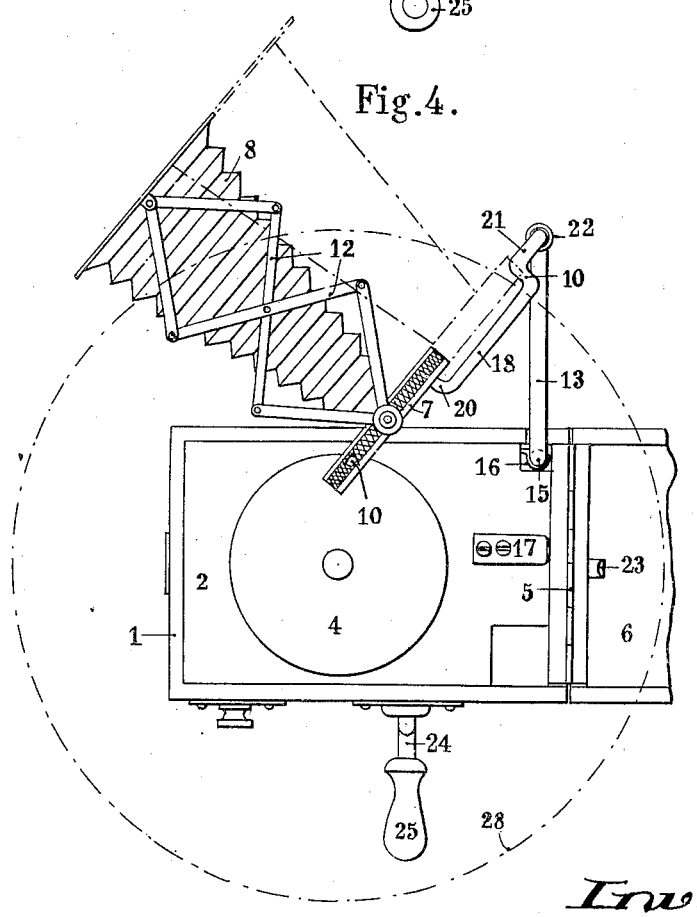

For playing, this socket 22 fits as shown in Figs. 3 to 8, on the end of the small branch 14 of the first arm, the small branch 20 of the second arm fitting either in the orifice 9 of the reproducer if the latter is provided with a needle, as illustrated in Figs. 3 and 4, or in the second orifice 10 of the same reproducer, if the latter is provided with a sapphire, as shown in Figs. 5 and 6.

When the reproducer plays with a needle, it is possible to cause it to pivot about the small branch 20 of the supporting arm above described and to bring it in the position shown in dotted lines in Figs. 3 and 4, in which the reproducer rests in the U-shaped portion formed by the second arm and is placed entirely above the plate 2, permitting an easy removal of the record which rests on the latter, for its replacing and the changing of needle.

When the apparatus is not in use, the second supporting arm above described is placed in the cover 6 of the box 1 and is held in the latter by a hook 23 acting as a spring.

This hook 23 fixed on cover 6 is bent perpendicularly as shown in 23ª in its lower extremity so as to permit the placing of a small box for needles 32 between its flat side and the box cover 6.

The winding up crank is also placed in the box, the arm 24 of this crank resting on the removable plate 2 of the said box, on which it is held by the spring hook 17 holding the first arm 13—14—15, the handle 25 of the crank entering within the said box, through an opening 26 cut out in the plate 2.

This crank terminates in a screw threaded portion 27 which fits, by screwing, in a sleeve having an inner screw thread and rigid with the winding up shaft.

Finally, the disc 28 of usual diameter, rests on the plate 4 of small diameter and is firmly held on the latter by means of a sleeve 29 which covers the upper end of the vertical shaft carrying the disc and is provided with one or more spring lugs 30 or other suitable locking members fitting in a circular groove 31 of the shaft 3, as illustrated in Fig. 11.

According to the form of construction shown in Figs. 13 and 14 the spring sleeve 29 which covers the upper end of the vertical shaft 3 has in its lower section two small splits or openings diametrically opposed in which a wire spring 33 enters which fits into the circular groove of shaft 3.

In the modification shown in Figs. 15 to 18, inclusive, 50 designates the casing and 51 the cover thereof. The horn 52 in this instance is also extensible and collapsible and it is provided at its outer end with a rigid rectangular frame 53 having a sleeve 54 at its lower portion. The sleeve carries the horizontal portion 55 of a pivoted angular arm 56, the vertical portion 57 of which (as shown in Fig. 18) may be inserted in a socket 58 in the cover.

The part 57 may freely turn in the socket 58 and the part 55 may readily turn in the sleeve 54, but the part 55 is fixed against axial movement by any suitable means. Due to this construction the outer end of the horn 52 may swing about both a vertical and a horizontal axis. The swinging movement about the horizontal axis permits the small end of the horn to be swung upwardly for the purpose of placing a record on the table 59 and the swinging about the vertical axis permits the needle or sapphire to travel from the outer edge of the record toward the center of the same.

The sound box 60 is arranged at the small end of the horn and in this form of the invention, the sound box may be swung about a vertical axis to position the sound box parallel to the frame 53 or at an angle to said frame, for the purpose of accommodating hill and dale or laterally grooved records. To accomplish this result lazy tongs 61 are pivotally connected to the frame 53 at the points 62 and to the sound box at the points 63. The pivots at the points 63 are formed by thumb screws 64 which function to fix the sound box in various positions.

When the sound box is placed at an angle to the frame 53, a needle 65, held in place by a thumb screw 66, may be used in playing a record. When, however, the sound box is arranged parallel to the frame 53, a sapphire or the like may be placed in the aperture 67 and held in place by a similar thumb screw. Obviously the needle will be removed when the sapphire is in use, and vice versa.

The above described arrangements are, of course, given by way of example only; the forms, materials and dimensions of the constituent parts can be modified without departing thereby from the principle of the invention.

Claims:

1. A sound reproducing apparatus including a supporting structure, a rigid frame pivotally mounted on said structure for movement about a vertical axis and a horizontal axis, a bendable bellows horn collapsible in the direction of its axis and having its large end connected to said frame, a sound box connected to the small end of said horn and movable relatively to the horn about a vertical axis parallel to the first mentioned vertical axis, and means for locking the sound box in various adjusted positions.

2. A sound reproducing apparatus including a box consisting of a body and cover, a record supporting table rotatably mounted on the body of the box, an angular arm pivotally mounted on the box cover for movement about a vertical axis, a rigid frame pivotally connected to said arm for movement about a horizontal axis, an extensible horn having its large end connected to said frame, a sound box connected to the small end of the horn and adapted to carry a needle to cooperate with a record on said table, said sound box being movable about a vertical axis parallel to the first mentioned vertical axis and the horn being bendable to accommodate such movement, and means for locking the sound box in various adjusted positions relatively to said frame.

3. A sound reproducing apparatus including a box consisting of a body and a cover, a rotatable record support mounted on the upper portion of the box body, a member pivotally mounted on the cover for movement about a vertical axis, a frame mounted on said member for movement about a horizontal axis, an extensible flexible horn having its large end connected to said frame, a sound box connected to the small end of the horn, said member being detachably connected to the cover to permit the frame, horn and sound box to be housed within the cover when the horn is in collapsed condition, adjustable struts connecting the frame and sound box, said sound box being pivotally connected to the struts for movement about a vertical axis arranged parallel to the first mentioned vertical axis and the horn being bendable to permit movement of the sound box, and means for locking the sound box in various adjusted positions relatively to said frame.

4. A sound reproducing apparatus including a box consisting of a body and cover, a record supporting table rotatably mounted on the body of the box, supporting means pivotally mounted on the box for movement about an axis, a rigid frame pivotally connected to said supporting means for movement about an axis arranged at an angle to the first mentioned axis, a bendable bellows horn having its large end connected to said frame, a sound box connected to the small end of the horn and adapted to carry a needle to cooperate with a record on said table, bracing means connecting the frame and sound box, said sound box being movable on said bracing means about a vertical axis and the horn being bendable to accommodate such movement, and means for locking the sound box in various adjusting positions relatively to said frame.

In testimony whereof I hereunto affix my signature.

A. MIDENCE.